(12) United States Patent
Stanik et al.

(10) Patent No.: US 7,475,469 B2
(45) Date of Patent: Jan. 13, 2009

(54) PROCESS OF PRODUCING PROFILES, MORE PARTICULARLY, PROFILED TRACKS FOR JOINT PARTS

(75) Inventors: Markus Stanik, Albershausen (DE);
Willi Schnitzler, Troisdorf (DE); Udo Rothenbuecher, Kleinwallstadt (DE);
Uwe Runow, Rodgau (DE)

(73) Assignees: Ex-Cell-O GmbH, Eislingen/Fils (DE);
GKN Driveline International GmbH, Lohmar (DE)

( * ) Notice: Subject to any disclaimer, the term of this patent is extended or adjusted under 35 U.S.C. 154(b) by 0 days.

(21) Appl. No.: 11/465,272

(22) Filed: Aug. 17, 2006

(65) Prior Publication Data
US 2007/0084317 A1    Apr. 19, 2007

Related U.S. Application Data

(63) Continuation of application No. PCT/EP2005/000624, filed on Jan. 22, 2005.

(30) Foreign Application Priority Data

Feb. 18, 2004    (DE) ...................... 10 2004 008 872

(51) Int. Cl.
*B23P 15/00* (2006.01)
*B23C 3/00* (2006.01)
*B23C 1/08* (2006.01)
*B23C 1/12* (2006.01)

(52) U.S. Cl. .................... 29/557; 29/898.066; 29/27 C; 409/132; 409/201

(58) Field of Classification Search ......... 409/131–132, 409/201, 192, 213, 217; 29/557–558, 898.066, 29/898.063, 898.06, 898, 27 C, 27 R
See application file for complete search history.

(56) References Cited

U.S. PATENT DOCUMENTS

| | | | |
|---|---|---|---|
| 3,277,613 A | | 10/1966 | Brady et al. |
| 4,818,156 A | | 4/1989 | Bauer |
| 4,850,761 A | * | 7/1989 | Breuer et al. ............... 409/132 |
| 4,945,487 A | * | 7/1990 | Kimura et al. ............. 700/160 |
| 5,354,961 A | * | 10/1994 | Diot et al. ................ 219/69.13 |
| 5,378,091 A | * | 1/1995 | Nakamura .................. 409/132 |
| 5,916,013 A | | 6/1999 | Naumann et al. |
| 2005/0139048 A1 | | 6/2005 | Feinauer et al. |
| 2005/0186036 A1 | | 8/2005 | Doerfel et al. |

FOREIGN PATENT DOCUMENTS

| DE | 81 26 582 U1 | | 11/1982 |
|---|---|---|---|
| FR | 2 421 024 A | | 11/1979 |
| JP | 01078712 A | | 3/1989 |
| WO | WO 92/14580 | | 9/1992 |
| WO | WO-03/053617 A1 | * | 7/2003 |
| WO | WO 2004/012888 A1 | | 2/2004 |

* cited by examiner

*Primary Examiner*—Erica E Cadugan
(74) *Attorney, Agent, or Firm*—Alston & Bird LLP

(57) ABSTRACT

A process of producing profiled tracks for joint parts is provided, wherein a cutting tool acts on the workpiece, a workpiece machining being performed with the cutting tool during the relative forward movement between workpiece and tool, and a workpiece machining being performed with the same cutting tool during the return movement following the forward movement.

18 Claims, 2 Drawing Sheets

PROCESS OF PRODUCING PROFILES, MORE PARTICULARLY, PROFILED TRACKS FOR JOINT PARTS

CROSS REFERENCE TO RELATED APPLICATIONS

This application is a continuation of international application PCT/EP2005/000624, filed on Jan. 22, 2005, and also claims the benefit of German Application No. 10 2004 008 872.1, filed Feb. 18, 2004, both of which are incorporated herein by reference in their entirety and for all purposes.

BACKGROUND OF THE INVENTION

The invention relates to a process of producing profiled tracks for joint parts, wherein a cutting tool acts on the workpiece. A machine tool by means of which such a process can be carried out is described in WO 2004/1288 and US 2005/0139048 A1.

SUMMARY OF THE INVENTION

In accordance with the present invention, a process is provided with which the use of a tool is optimized. In accordance with the present invention, workpiece machining is performed with a cutting tool during the relative forward movement between workpiece and tool and workpiece machining is performed with the same cutting tool during a return movement following the forward movement. This means that, as a result of the solution in accordance with the invention, a cutting operation is carried out by the same tool during the forward movement and return movement. The cutting operation can be milling, turning, or grinding, for example. In this way, it is possible to minimize machining times. More particularly, the same tool can be used for producing a profiled track by means of a roughing cut and a subsequent finishing cut. There is no need for an external tool change (exchange of tool) or an internal tool change (positioning of the workpiece relative to a further tool spindle). In consequence, there is also no need for there to be more tool spindles than workpiece holding devices. The inventive process can be used, for example, for producing ball tracks of outer joint parts and inner joint parts.

It is advantageous if the return movement takes place after an end point of the forward movement has been reached. As a result, the return movement can follow the forward movement. More particularly, the cutting tool and workpiece are guided relative to one another in a first direction, and they are guided relative to one another in a second direction constituting the counter direction. A forward movement and a return movement are made possible by the relative guidance between tool and workpiece.

In principle, it is possible for the workpiece to be held translatorily and for the tool to be moved in a translational manner relative to the workpiece in order to put into effect a forward movement and a return movement. It is advantageous for the workpiece to be guided relative to a machine frame. It is then possible, for example, to feed a workpiece to a tool to permit the production of a profiled track. In such a case, a tool spindle does not have to be moved during the machining operation.

It is particularly advantageous if rough machining takes place during the forward movement and finish machining during the return movement. It is then possible, during a first stage, to produce a "pre-track" with a lesser accuracy and a reduced surface quality, which "pre-track" can then be finished, i.e., given its final shape, by precision machining.

It is provided that a setting angle of the tool is observed during the forward movement. Furthermore, it is provided that a setting angle of the tool is observed during the return movement. It is particularly advantageous if the tool has a different setting angle during the forward movement than during the return movement. This means that different main cutting tool regions act on the workpiece. It also means that during the forward movement and during the return movement different tool regions are subjected to different degrees of wear. As a result, it is possible to make better use of the cutting tool as a whole. This, in turn, makes it possible—because different main cutting edge regions of the tool act on the workpiece to be machined—to carry out a rough machining operation first and then to carry out a precision machining operation during the return movement. During the return movement, a different cutting edge region is then mainly used which has not yet been worn as a result of the forward movement.

Owing to the better use of the tool, tool costs are reduced because the tool has to be replaced less frequently. In turn, the machine costs are reduced because tool exchanging times are also reduced, for example. Because finish machining of the workpiece in respect of a profiled track, for example, can be carried out in a process where the forward movement and return movement are combined, a minimum machining time is, in turn, achieved. More particularly, there is no need for a tool exchange for carrying out rough machining and precision machining (which is the case if different tools are used for rough machining and precision machining).

For the same reason, it is advantageous if, when reaching, or after having reached, an end point of the forward movement, the depth of feed of the cutting tool is changed. It is then possible to change over between a rough machining operation and a precision machining operation (with a reduced depth of feed).

For the above-mentioned reasons, it is particularly advantageous if the change in the setting angle takes place in such a way that different main cutting edge regions of the tool act on the workpiece during the forward movement and return movement. This means that the tool can be used effectively. For example, the setting angle, with reference to a direction of displacement between tool and workpiece, is greater during the forward movement than during the return movement. The difference can range between a few degrees. By way of example, in one embodiment, the setting angle for the forward movement amounts to 22.5° and for the return movement 20°. Different setting angles are also possible. A setting angle can easily be adjusted by pivoting a tool holding device. The setting angle can then be changed by changing the pivot position of the tool holding device.

It is particularly advantageous if a plurality of workpieces is machined at the same time. As the solution in accordance with the invention does not require a tool change between rough machining and finish machining operations (neither externally by changing the tool nor internally inside a machine by changing over to a different tool spindle), it is possible to machine a number of workpieces synchronously if a corresponding number of workpiece holding devices and a corresponding number of tool holding devices with tools is provided. It is thus also possible to minimize the required number of tool spindles because only one tool spindle has to be provided for a workpiece. In processes known from the state of the art, it is necessary to provide two tool spindles per workpiece holding device, one each for rough machining and finish machining.

More particularly, the process in accordance with the invention is carried out on a machine tool. A machine tool can advantageously be used for carrying out the process in accordance with the invention. More particularly, a suitable machine tool comprises a pivotable tool holding device. By using such a pivotable tool holding device, a tool setting angle for a workpiece to be machined can be set and also changed to be able to use different tool regions. For example, the machine tool can be provided in the form of a multi-spindle machine tool.

It is particularly advantageous if a tool holding device comprises a plurality of tools which corresponds to a number of workpiece holding devices. It is then possible to simultaneously machine a plurality of workpieces synchronously, and by using the machining process involving a forward movement and return movement per workpiece with reference to producing profiled tracks, it is possible to finish production of the workpieces.

The following description of a preferred embodiment in connection with the drawings serves to explain the invention in greater detail.

BRIEF DESCRIPTION OF THE DRAWINGS

In order to assist the understanding of certain embodiments of the invention, reference will now be made to the appended drawings, which are not necessarily drawn to scale, and wherein.

DETAILED DESCRIPTION OF THE INVENTION

The present invention now will be described more fully hereinafter. However, this invention may be embodied in many different forms and should not be construed as limited to the embodiments set forth herein; rather, these embodiments are provided so that this disclosure will satisfy applicable legal requirements. Like numbers refer to like elements throughout. As used in this specification and the claims, the singular forms "a," "an," and "the" include plural referents unless the context clearly dictates otherwise.

Figure 1:
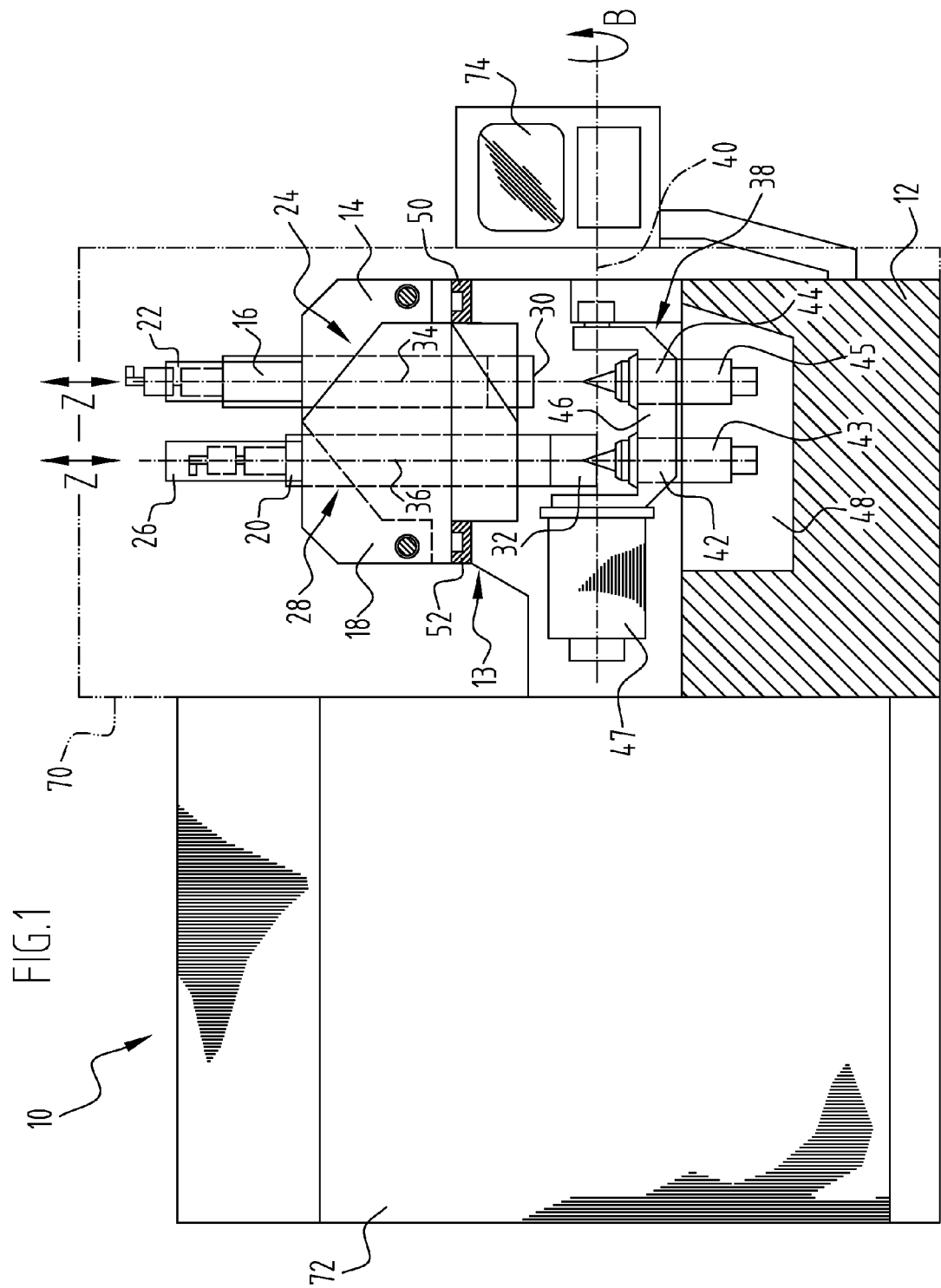
FIG. 1 is a diagrammatic side sectional side view of an example of a machine tool by means of which the process in accordance with the invention can be carried out.

In FIG. 1, an embodiment of a multi-spindle machine tool by means of which the process in accordance with the invention can be carried out has, in its entirety, been given the reference number 10. It comprises a machine frame 12 for positioning the multi-spindle machine tool 10 (shown here with two spindles) so as to be aligned on a base. On a stand 13 of the machine frame 12, a first spindle slide 14 is guided so as to be linearly displaceable in a direction X. More particularly, this direction X is a horizontal direction. The first spindle slide 14 carries a first workpiece spindle 16 to which there is rotatably fixable a workpiece to be machined. The first workpiece spindle 16 is guided at the first spindle slide 14 so as to be displaceable in a transverse direction Z in relation to the direction X, so that the distance of a workpiece held at the first workpiece spindle 16 can be set relative to the machine frame 12. An axis of rotation of the first workpiece spindle 16 around which a held workpiece is rotatable extends parallel to the Z-direction.

Furthermore, there is provided a second spindle slide 18 which is also guided at the machine frame 12 so as to be linearly displaceable in the X-direction. This second spindle slide 18 holds a second workpiece spindle 20 which is held at the second spindle slide 18 so as to be linearly displaceable in the Z-direction. More particularly, the two workpiece spindles 16 and 20 are aligned so as to extend substantially parallel relative to one another.

For driving the first workpiece spindle 16 in its displacement movement along the Z-axis, there is provided a first drive 22. For example, it can be a hydraulic drive, a ball screw drive or a linear motor. A drive unit of the first drive 22 is positioned at the first spindle slide 14 and is moved together with it in the X-direction.

For guiding the first workpiece spindle 16, the first spindle slide 14 comprises a guiding device which, in its entirety, has been given the reference number 24 and at which the first workpiece spindle 16 driven by the first drive 22 is displaceable in the Z-direction. The Z-direction, more particularly, extends vertically, i.e., parallel to the direction of gravity.

For moving the second workpiece spindle 20 relative to the second spindle slide 18, there is provided a second drive 26, which effects the linear displacement of the second workpiece spindle 20 at a guiding device 28 in the Z-direction relative to the second spindle slide 18.

At their lower ends, the workpiece spindles 16 and 20 are each provided with a workpiece holding device 30, 32 to which the respective workpieces can be fixed so as to be rotatable around longitudinal axes 34, 36 of the respective workpiece spindles 16, 20.

At the machine frame 12, there is arranged a tool receiving device 38 so as to be pivotable around an axis B, with this pivot axis 40 being orientated transversely to the Z-direction and X-direction and, more particularly, being aligned horizontally. In the case of a two-spindle machine tool, the tool receiving device 38 comprises a first tool receiving element 42 and a second tool receiving element 44 which are arranged at a distance from one another. The tool receiving elements 42, 44 are positioned at rotatably driven tool spindles 43, 45, so that the correspondingly held tools such as milling tools or drilling tools are rotatable around a spindle axis. It is then possible to machine two workpieces simultaneously by respective tools, with a first workpiece being held at the first workpiece spindle 16 and a second workpiece at the second workpiece spindle 20.

The two tool receiving elements 42 and 44 are positioned on a yoke-shaped rocker arm 46, which is pivotable around the pivot axis 40 (B-axis). For carrying out the pivot movement, there is provided a drive 47. Every pivot position of the tool receiving device 38 can be set within a certain pivot range, so that in a certain set pivot position, the respective workpieces held at the workpiece spindles 16 and 20 can be machined by the tools fixed at the tool receiving device 38 and, more particularly, provided in the tool receiving elements 42, 44. For example, it is thus possible to produce a constant velocity joint (FIG. 2) which comprises ball tracks in an axle journal and in a hub.

More particularly, it is possible to use suitable tools for carrying out soft milling, grinding, or hard milling operations. Hard turning operations can also be carried out. For this purpose, there are provided suitable additional devices, such as one or several rotary consoles with a suitable turning tool or an additional spindle, which are arranged in the region of the machining zone of the workpieces (not shown in the drawings).

It is also possible to carry out subsequent machining operations on a workpiece in that, for example, it is first held at the first workpiece spindle 16 and machined by a first tool and thereafter passed on to the workpiece spindle 20 and then machined by a second tool.

At the machine frame 12 there is provided a pivot space 48 to enable the tool receiving device 38 to pivot at the machine frame 12 in a certain pivot range without being obstructed. Furthermore, chips and the like can be extracted from said pivot space 48.

With reference to the Z-direction, the spindle slides 14 and 18 are guided so as to be displaceable above the tool receiving device 38 in the X-direction. For this purpose, there is provided a first guide 50 which, more particularly, comprises a guiding rail which is arranged at a distance from the tool receiving device 38 above it. Furthermore, there is provided a second guide 52 which is arranged at a parallel distance from the first guide 50, more particularly at the same level as the first guide 50 in the Z-direction above the tool receiving device 38. The second guide 52, more particularly, again comprises a guiding rail. More particularly, the two guides 50 and 52 are arranged horizontally. The guides 50, 52 are positioned on the stand 13. The guides 50, 52 can also be arranged so as to be offset in the Z-direction in order, for example, to be able to additionally reinforce a spindle slide in the direction of its height, should this be necessary.

In its region facing the guides 50, 52, the first spindle slide 14 is designed to be L-shaped or triangular in such a way that it comprises a first leg which is orientated along the first guide 50 and guided thereon. For example, there are provided two spaced guiding shoes in order to linearly displaceably guide the first leg on the first guide 50. The first leg is connected to a second leg which is orientated transversely to the first leg and which is coupled to the second guide 52, for example, by means of a guiding shoe in order to linearly displaceably guide the second leg on the second guide 52. Between and on the two legs, there is positioned the first workpiece spindle 16 between the two guides 50 and 52.

The face of contact of the first spindle slide 14 with the guide 50, for the purpose of being linearly displaceably coupled thereto, is greater than the face of contact to be coupled to the second guide 52. For example, the first face of contact is formed via the two guiding shoes, whereas for the second guide 52 the face of contact is formed via the one guiding shoe only.

The second spindle slide 18 also comprises a first leg which is orientated along the second guide 52 and, for example, coupled thereto via two guiding shoes. A second leg which is coupled to the first guide 50 via a guiding shoe is arranged transversely to this first leg. Thus, the second spindle slide 18, too, comprises an L-shaped or triangular outer shape, with the face of contact in contact with the second guide 52 being greater than the face of contact with the first guide 50. The second workpiece spindle 20 is positioned between the first leg and the second leg of the spindle slide 18, between the two guides 50 and 52, and facing the other workpiece spindle 16, with there remaining a free intermediate region between the two workpiece spindles 16, 20. The L-shaped or triangular shape refers to a cross-section in a projection on the plane formed by the two guides 50 and 52, at least in the region where the spindle slides 14 and 18, respectively, are coupled to these guides 50 and 52.

Such a multi-spindle machine tool is described in the international application PCT/EP03/08101 filed on Jul. 24, 2003, which is incorporated by reference herein. However, the process in accordance with the invention which will be explained in greater detail below can also be carried out by differently designed machine tools.

Figure 2:
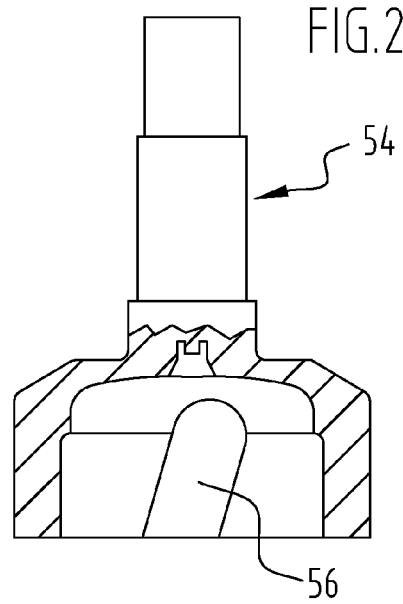
FIG. 2 is an example of a workpiece (plunging joint) with a ball track.

FIG. 2, by way of example, shows a workpiece 54 machined by the process in accordance with the invention. This workpiece 54 is a joint with a plurality of milled ball tracks 56. Such a ball track 56 forms a guiding track for a bearing ball. The illustration refers to an outer joint part. The process in accordance with the invention can also be used for inner joint parts (hubs). It is possible to produce straight or inclined tracks.

Figure 3:
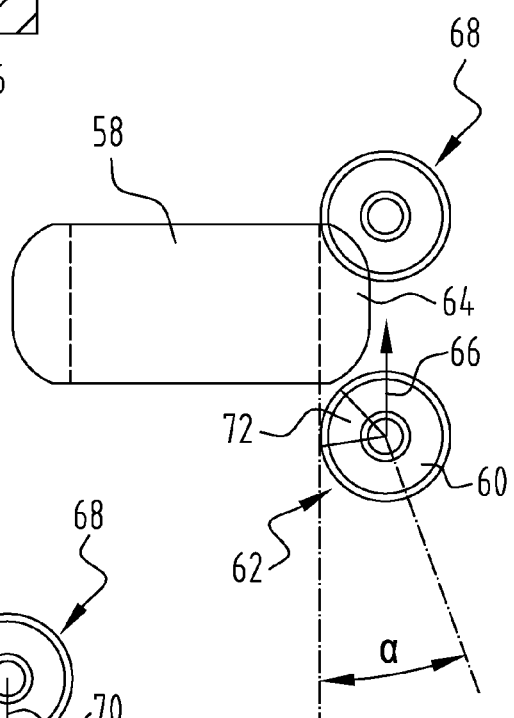
FIG. 3 is a diagrammatic partial view of two partial stages during the forward movement between workpiece and cutting tool.
Figure 4:
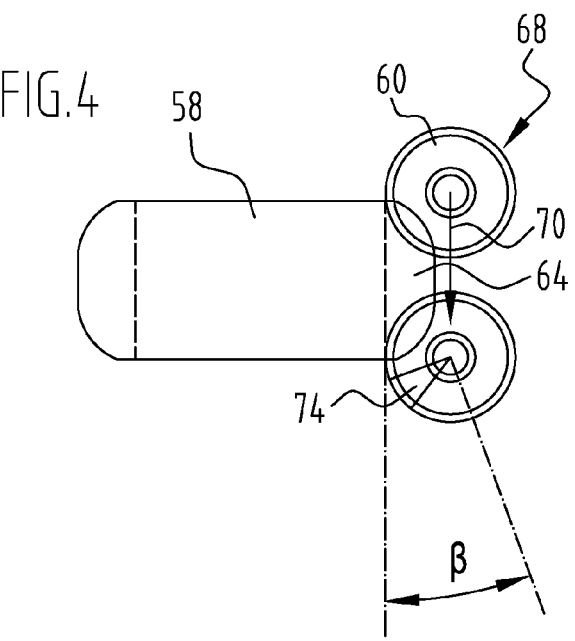
FIG. 4 is a diagrammatic illustration of two partial stages during the return movement between workpiece and tool.

The process in accordance with the invention functions as follows, and, by way of example, it will be explained with reference to FIGS. 3 and 4. A workpiece 58 and a milling tool 60 serving as an example of a cutting tool are moved relative to one another. FIG. 3 shows a position 62 of the milling tool 60 wherein the latter starts to act on the workpiece 58 for the purpose of (profile) milling a profiled track (ball track) 64. In the machine tool 10 used by way of example, the milling tool 60 is held on a tool spindle 62. The workpiece 58 is held by the workpiece holding device 32. A relative forward movement between the milling tool 60 and the workpiece 58 then takes place. This forward movement is indicated by the arrow having the reference number 66. In the case of the machine tool 10, this forward movement 66 is put into effect by a movement of the workpiece holding device 32 in the direction Z towards the milling tool 60.

The tool receiving element 42 is positioned in a certain pivot position relative to the axis B. There is thus defined a setting angle α of the milling tool 60 relative to the workpiece 58. This setting angle is observed during the forward movement between workpiece 58 and milling tool 60. As a result of the relative position of the slide 18 relative to the milling tool 60, there is set a depth of feed for the milling tool 60.

The forward movement 66 continues until an end point of the forward movement has been reached. This means that a reversal position 68 has been reached. In the case of the example of the machine tool 10, the reversal position 68 constitutes a reversal point for the movement of the tool holding device 32 in the direction Z.

During the forward movement 66, there is carried out a rough milling operation. For example, there is produced a cut with a cut depth of 6 to 7 mm, if the ball track of a joint is milled. More particularly, it is a rough cut.

When reaching, or after having reached, the reversal position 68, the setting angle of the milling tool 60 is changed (FIG. 4) in that the pivot position of the tool receiving element 42 is changed. The new setting angle β differs from the setting angle α for the forward movement 66. In the example illustrated, this changed setting angle β is smaller than the setting angle α. A return movement 70 with a changed setting angle β then starts from the reversal position 68 in the counter direction relative to the forward movement 66.

In the case of the example of the machine tool according to FIG. 1, the workpiece holding device 32 moves upwardly in the Z-direction in order to put the return movement 70 into effect. As a result, the milling tool 60 moves in the profiled track produced during the forward movement 66. During the return movement, the depth of feed, more particularly, has also been changed to be able to carry out a finish milling operation. More particularly, the cutting depth is in the range of one tenth of a millimeter in order to achieve a high degree of accuracy and a high surface quality.

By changing the setting angle after the forward movement has taken place, a different (main) cutting edge region of the milling tool acts on the workpiece 58. FIG. 3, by way of example, shows an effective cutting edge region having the reference number 72. After the setting angle has been changed, there is available an effective cutting edge region 74 (FIG. 4) which differs from the cutting edge region 72. Consequently, as a result of the forward movement and return movement for producing the profiled track 64, the milling tool 60 is utilized more effectively because wear occurs in a more uniform manner. This is due to the fact that different regions of the milling tool 60 mainly act on the workpiece 58 when a forward movement 66 and a return movement 70 take place.

The solution in accordance with the invention increases the economic efficiency since tool costs are reduced owing to the more effective use of the milling tool 60. In addition, the machining operation can be carried out more quickly because, as a result of the forward movement and return movement when the workpiece holding device 32 moves up and down, it is possible to produce the profiled track 64, including finish milling. There is no need to change the milling tool for rough milling and finish milling (in that, for example, after having been rough-milled, the workpiece is fed towards a further tool). By changing the setting angle between the forward movement 66 and the return movement 70, different tool regions are utilized, so that, in turn, the same tool can be used for carrying out the rough machining and finish machining operations.

The process in accordance with the invention can also be used for other profile producing processes, such as turning and grinding. More particularly, the process in accordance with the invention can be used in connection with multi-spindle machine tools with a plurality of workpieces being machinable at the same time since, per workpiece, there is no need to change the tool for the production of hubs as the same tool 60 can be used for both rough machining and finish machining.

Hereinabove, the process in accordance with the invention was described with reference to the machine tool 10. In principle, it is also possible to practice the process in accordance with the invention with other machine tools. For example, the process in accordance with the invention can also be used on a machine tool which comprises only one workpiece holding device. The process in accordance with the invention can also be used if it is not a workpiece holding device which is displaced relative to the machine frame, but if a milling tool holding device is displaceably guided at the machine frame. The setting angle of a milling tool at a workpiece can also be set in that a workpiece holding device is pivoted relative to a machine frame.

Many modifications and other embodiments of the inventions set forth herein will come to mind to one skilled in the art to which these inventions pertain having the benefit of the teachings presented in the foregoing description. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A process for producing profiled tracks for joint parts, wherein a cutting tool acts on a workpiece, comprising:
    machining the workpiece with the cutting tool during a relative forward movement between workpiece and tool and producing a profiled track; and
    machining the profiled track produced during the forward movement with the same cutting tool during a return movement following the forward movement;
    wherein the tool has a different setting angle with reference to a direction of displacement between the tool and the workpiece during the forward movement than during the return movement; and
    wherein the change in the setting angle is effected in such a way that different cutting edge regions of the tool act mainly on the workpiece during the forward movement and the return movement.

2. The process according to claim 1, wherein the return movement takes place after an end point of the forward movement has been reached.

3. The process according to claim 1, wherein the tool and the workpiece are guided relative to one another in a first direction during a first machining step, and are guided relative to one another in a second counter direction during a second machining step.

4. The process according to claim 1, wherein the workpiece is guided so as to be displaceable relative to a machine frame.

5. The process according to claim 1, wherein a rough machining operation is performed during the forward movement.

6. The process according to claim 1, wherein a finish machining operation is performed during the return movement.

7. The process according to claim 1, wherein a setting angle with reference to a direction of displacement between the tool and the workpiece of the tool is observed during the forward movement.

8. The process according to claim 1, wherein a setting angle with reference to a direction of displacement between the tool and the workpiece of the tool is observed during the return movement.

9. The process according to claim 1, wherein the setting angle with reference to a direction of displacement between tool and workpiece is greater during the forward movement than during the return movement.

10. The process according to claim 1, wherein a setting angle of the tool with reference to a direction of displacement between the tool and the workpiece is changed when reaching, or after having reached, an end point of the forward movement.

11. The process according to claim 1, wherein a depth of feed of the tool is changed when reaching, or after having reached, an end point of the forward movement.

12. The process according to claim 1, wherein a tool holding device is pivoted in order to adjust a setting angle of the tool with reference to a direction of displacement between the tool and the workpiece.

13. The process according to claim 1, wherein a plurality of workpieces are machinable simultaneously.

14. The process according to claim 1, wherein the process is carried out using a machine tool.

15. The machine tool according to claim 14, wherein the machine tool comprises a pivotable tool holding device.

16. The machine tool according to claim 14, wherein the machine tool is a multi-spindle machine tool.

17. The machine tool according to claim 14, wherein the machine tool comprises a tool holding device comprising a plurality of tools corresponding to a number of workpiece holding devices.

18. A process for producing profiled tracks for joint parts, wherein a cutting tool acts on a workpiece, comprising:
    machining the workpiece with the cutting tool and producing a profiled track during a relative forward movement between workpiece and tool in a first direction, wherein the cutting tool is set at a first setting angle with reference to a direction of displacement between the tool and the workpiece during said machining in the first direction;

changing the setting angle of the cutting tool with reference to a direction of displacement between the tool and the workpiece to a second setting angle different from the first setting angle; and machining the profiled track produced during the forward movement with the same cutting tool during a return movement in a second counter direction following the forward movement, the cutting tool being set at the second setting angle during said machining in the counter direction, wherein the change in the setting angle of the cutting tool is effected in such a way that different cutting edge regions of the cutting tool act mainly on the workpiece during the forward movement and the return movement.

* * * * *